United States Patent
McCann

(10) Patent No.: US 9,319,378 B2
(45) Date of Patent: Apr. 19, 2016

(54) METHODS, SYSTEMS, AND COMPUTER READABLE MEDIA FOR USING A DIAMETER ROUTING AGENT (DRA) TO OBTAIN MAPPINGS BETWEEN MOBILE SUBSCRIBER IDENTIFICATION INFORMATION AND DYNAMICALLY ASSIGNED INTERNET PROTOCOL (IP) ADDRESSES AND FOR MAKING THE MAPPINGS ACCESSIBLE TO APPLICATIONS

(71) Applicant: Tekelec, Inc., Morrisville, NC (US)

(72) Inventor: Thomas Matthew McCann, Raleigh, NC (US)

(73) Assignee: TEKELEC, INC., Morrisville, NC (US)

( * ) Notice: Subject to any disclaimer, the term of this patent is extended or adjusted under 35 U.S.C. 154(b) by 304 days.

(21) Appl. No.: 13/748,547

(22) Filed: Jan. 23, 2013

(65) Prior Publication Data
US 2014/0207941 A1 Jul. 24, 2014

(51) Int. Cl.
*G06F 15/16* (2006.01)
*H04L 29/12* (2006.01)
*H04L 29/06* (2006.01)

(52) U.S. Cl.
CPC ........ *H04L 61/1588* (2013.01); *H04L 61/2076* (2013.01); *H04L 61/6054* (2013.01); *H04L 63/0892* (2013.01)

(58) Field of Classification Search
CPC ................. H04L 61/1588; H04L 61/6054
USPC .................................................. 709/223, 224
See application file for complete search history.

(56) References Cited

U.S. PATENT DOCUMENTS

| 1,872,857 | A  | 8/1932  | Wesson et al. |
| 6,298,383 | B1 | 10/2001 | Gutman et al. |
| 7,292,592 | B2 | 11/2007 | Rune          |

(Continued)

FOREIGN PATENT DOCUMENTS

CN   101483826 A    7/2009
CN   ZL 201080065174.6   6/2015

(Continued)

OTHER PUBLICATIONS

Decision to Grant for Chinese Patent Application No. 201080065174.6 (Apr. 16, 2015).

(Continued)

*Primary Examiner* — Adnan Mirza
(74) *Attorney, Agent, or Firm* — Jenkins, Wilson, Taylor & Hunt, P.A.

(57) ABSTRACT

The subject matter described herein includes methods, systems and computer readable media for using a Diameter routing agent (DRA) to obtain mappings between mobile subscriber identification information and dynamically assigned Internet protocol (IP) addresses and for making the mappings accessible to applications. One exemplary method includes, at a DRA, receiving a Diameter message containing a dynamically assigned IP address and mobile subscriber identification information. The method further includes routing the received Diameter signaling message. The method further includes copying, by the DRA, the IP address and the mobile subscriber identifier from the message. The method further includes making a mapping between the dynamically assigned IP address and the subscriber identification information accessible to applications.

24 Claims, 7 Drawing Sheets

(56) References Cited

U.S. PATENT DOCUMENTS

| | | |
|---|---|---|
| 7,319,857 B2 | 1/2008 | Baldwin et al. |
| 7,551,926 B2 | 6/2009 | Rune |
| 7,916,685 B2 | 3/2011 | Schaedler et al. |
| 8,015,293 B2 | 9/2011 | Schaedler et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,942,747 B2 | 1/2015 | Marsico |
| 9,059,948 B2 | 6/2015 | Schaedler at al. |
| 9,148,524 B2 | 9/2015 | Deo |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2006/0002308 A1 | 1/2006 | Na et al. |
| 2006/0030320 A1 | 2/2006 | Tammi et al. |
| 2006/0045249 A1 | 3/2006 | Li et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0172730 A1 | 8/2006 | Matsuda |
| 2006/0221972 A1 | 10/2006 | Bhargava et al. |
| 2006/0274744 A1 | 12/2006 | Nagai et al. |
| 2007/0121596 A1 | 5/2007 | Kurapati et al. |
| 2007/0153995 A1 | 7/2007 | Fang et al. |
| 2007/0189215 A1 | 8/2007 | Wu et al. |
| 2007/0242637 A1 | 10/2007 | Dynarski et al. |
| 2007/0297419 A1 | 12/2007 | Asherup et al. |
| 2008/0039104 A1 | 2/2008 | Gu et al. |
| 2008/0256251 A1 | 10/2008 | Huotari et al. |
| 2009/0089435 A1 | 4/2009 | Terrill et al. |
| 2009/0129271 A1 | 5/2009 | Ramankutty et al. |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2010/0268814 A1 | 10/2010 | Cross et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0158090 A1* | 6/2011 | Riley et al. ............ 370/230 |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0225113 A1 | 9/2011 | Mann |
| 2011/0225280 A1 | 9/2011 | Delsesto et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1 | 4/2012 | Alonso Alarcon et al. |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0201203 A1 | 8/2012 | Miyagawa et al. |
| 2012/0202550 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1 | 9/2012 | Wallace et al. |
| 2012/0239771 A1 | 9/2012 | Rasanen |
| 2012/0311064 A1 | 12/2012 | Deo |
| 2013/0304843 A1 | 11/2013 | Chow et al. |
| 2014/0258423 A1 | 9/2014 | Schaedler et al. |

FOREIGN PATENT DOCUMENTS

| | | |
|---|---|---|
| EP | 1 357 720 A1 | 10/2003 |
| EP | 1 630 999 A1 | 3/2006 |
| EP | 2 107 725 A1 | 10/2009 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| JP | H11-224219 A | 8/1999 |
| JP | 4041038 B2 | 1/2008 |
| JP | 2010-0278884 A | 12/2010 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2010/139360 A1 | 12/2010 |
| WO | WO 2011/082090 A2 | 7/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |

OTHER PUBLICATIONS

Second Office Action for Japanese Patent Application No. 2013-556857 (Apr. 14, 2015).

Letter Regarding Notice of Grant for Japanese Patent Application No. 2013-556675 (Mar. 31, 2015).

Notice of Allowance and Fee(s) Due and Examiner-Initiated Interview Summary for U.S. Appl. No. 13/192,410 (Feb. 12, 2015).

Applicant-Initiated Interview Summary for U.S. Appl. No. 13/465,552 (Feb. 9, 2015).

Notice of Panel Decision from Pre-Appeal Brief Review for U.S. Appl. No. 13/192,410 (Feb. 4, 2015).

Supplemental Notice of Allowability for U.S. Appl. No. 13/366,928 (Dec. 26, 2014).

Non-Final Office Action for U.S. Appl. No. 13/465,552 (Oct. 17, 2014).

Letter Regarding Office Action for Japanese Patent Application No. 2013-556675 (Sep. 30, 2014).

Final Office Action for U.S. Appl. No. 13/192,410 (Sep. 25, 2014).

First Office Action for Japanese Application No. 2013-556857 (Sep. 24, 2014).

Notification of the First Office Action for Chinese Application No. 201080065174.6 (Aug. 13, 2014).

(56) References Cited

OTHER PUBLICATIONS

Camarillo et al., "The 3G IP Multimedia Subsystem (IMS), Merging the Internet and the Cellular Worlds," Second Edition (2006).
Communication of European publication number and information on the application of Article 67(3) EPC for European Application No. 14702996.1 (Nov. 4, 2015).
Notice of Allowance and Fee(s) Due and Applicant-Initiated Interview Summary for U.S. Appl. No. 14/190,071 (Oct. 30, 2015).
Supplemental Notice of Allowability & Response to Rule 312 Communication for U.S. Appl. No. 13/465,552 (Aug. 27, 2015).
Commonly-assigned, co-pending U.S. Appl. No. 14/826,289, filed Aug. 14, 2015 for "Methods, Systems, and Computer Readable Media for Providing Access Network Session Correlation for Policy Control,".
Letter Regarding Publication of Patent for Japanese Patent Application No. 2014-509509 (Aug. 5, 2015).
Letter Regarding Publication of Patent for Japanese Patent Application No. 2013-556857 (Aug. 5, 2015).
Letter Regarding Office Action for Japanese Patent Application No. 2013-556860 (Jul. 21, 2015).
Non-Final Office Action for U.S. Appl. No. 14/190,071 (Jul. 8, 2015).
Letter Regarding Publication of Patent for Japanese Patent Application No. 2013-556675 (Jun. 10, 2015).
Letter Regarding Notice of Grant for Japanese Patent Application No. 2014-509509 (Jun. 2, 2015).
Letter Regarding Notice of Grant for Japanese Patent Application No. 2013-556857 (May 26, 2015).
Notice of Allowance and Fee(s) Due and Examiner-Initiated Interview Summary for U.S. Appl. No. 13/465,552 (May 20, 2015).
Chiba et al., "Dynamic Authorization Extensions to Remote Authentication Dial in User Service (RADIUS)," RFC 5176, pp. 1-32 (Jan. 2008).
Rigney et al., "RADIUS Accounting," RFC 2866, pp. 1-26 (Jun. 2000).
Rigney et al., "Remote Authentication Dial in User Service (RADIUS)," RFC 2865, pp. 1-70 (Jun. 2000).
Notice of Allowance and Fee(s) Due for U.S. Appl. No. 13/366,928 (Sep. 3, 2014).
Extended European Search Report for European Application No. 12752952.7 (Aug. 27, 2014).
Extended European Search Report for European Application No. 12751783.7 (Jul. 22, 2014).
Extended European Search Report for European Application No. 12751812.4 (Jul. 16, 2014).
Notice of Allowance and Fee(s) Due for U.S. Appl. No. 13/409,893 (Jul. 10, 2014).
Notice of Allowance and Fee(s) Due for U.S. Appl. No. 13/409,914 (Apr. 25, 2014).
Supplemental Notice of Allowability for U.S. Appl. No. 13/409,949 (Apr. 24, 2014).
Notification of Transmittal of the International Search Report and the Written Opinion of the International Searching Authority, or the Declaration for International Patent Application No. PCT/US2014/011548 (Mar. 28, 2014).
Non-Final Office Action for U.S. Appl. No. 13/366,928 (Mar. 21, 2014).
Non-Final Office Action for U.S. Appl. No. 13/192,410 (Feb. 20, 2014).
Communication of European publication number and Information on the application of Article 67(3) EPC for European Application No. 12781800.3 (Feb. 12, 2014).
Advisory Action Before the Filing of an Appeal Brief for U.S. Appl. No. 13/366,928 (Feb. 10, 2014).
Extended European Search Report for European Application No. 10841605.8 (Feb. 3, 2014).
Notice of Allowance and Fee(s) Due for U.S. Appl. No. 13/409,949 (Jan. 14, 2014).
Final Office Action for U.S. Appl. No. 13/409,914 (Dec. 30, 2013).
Notification of Publication and Entry into Examination Procedure for Chinese Patent Application No. 201280013938.6 (Dec. 18, 2013).

Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
Declaration of Mark Kanode for U.S. Appl. No. 13/409,893 (Nov. 1, 2013).
Advisory Action for U.S. Appl. No. 13/192,410 (Oct. 24, 2013).
Final Office Action for U.S. Appl. No. 13/366,928 (Oct. 23, 2013).
Applicant-Initiated Interview Summary for U.S. Appl. No. 13/192,410 (Oct. 18, 2013).
Final Office Action for U.S. Appl. No. 13/409,949 (Sep. 19, 2013).
Advisory Action Before the Filing of an Appeal Brief for U.S. Appl. No. 13/409,893 (Sep. 13, 2013).
Notice of Allowance and Fee(s) Due for U.S. Appl. No. 12/974,869 (Aug. 19, 2013).
Final Office Action for U.S. Appl. No. 13/192,410 (Aug. 5, 2013).
Final Office Action for U.S. Appl. No. 13/409,893 (Jul. 1, 2013).
Non-Final Office Action for U.S. Appl. No. 13/409,914 (Jun. 7, 2013).
Notice of Allowance and Fee(s) Due for U.S. Appl. No. 13/412,352 (May 28, 2013).
Non-Final Office Action for U.S. Appl. No. 13/366,928 (Mar. 26, 2013).
Non-Final Office Action for U.S. Appl. No. 13/409,949 (Feb. 15, 2013).
Notice of Allowance and Fee(s) Due for U.S. Appl. No. 13/366,928 (Jan. 7, 2013).
Non-Final Office Action for U.S. Appl. No. 13/192,410 (Dec. 20, 2012).
Non-Final Office Action for U.S. Appl. No. 13/409,893 (Dec. 13, 2012).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of Europeanpublication number and information on the application of Article 67(3) EPC for European Patent Application No. 10841605.8 (Oct. 17, 2012).
Notification of Transmital of the International Search Report and the Written Opinion of the International Searching Authority, or the Declaration for International Patent Application No. PCT/US2012/027281 (Jun. 15, 2012).
Notification of Transmittal of the International Search Report and the Written Opinion of the International Searching Authority, or the Declaration for International Application No. PCT/US2012/027263 (Jun. 14, 2012).
Notification of Transmittal of the International Search Report and the Written Opinion of the International Searching Authority, or the Declaration for International Patent Application No. PCT/US2012/027736 (Jun. 12, 2012).
Notification of Transmittal of the International Search Report and the Written Opinion of the International Searching Authority, or the Declaration for International Patent Application No. PCT/US2012023971 (Jun. 11, 2012).
Notification of Transmittal of the International Search Report and the Written Opinion of the International Searching Authority, or the Declaration for the International Patent Application No. PCT/US2012/027269 (Jun. 11, 2012).
Decision to grant a European patent pursuant to Article 97(1) EPC for European Application No. 05854512.0 (Mar. 15, 2012).

(56) References Cited

OTHER PUBLICATIONS

Communication under Rule 71(3) EPC for European application No. 05854512.0 (Nov. 11, 2011).
Notification of the Transmittal of the International Search Report and the Written Opinion of the International Searching Authority, or the Declaration for International Application No. PCT/US2010/061934 (Oct. 25, 2011).
Notice of Allowance and Fee(s) Due for U.S. Appl. No. 11/303,757 (May 11, 2011).
"3rd Generation Partnership Project; Technical Specification Group Core Network and Terminals; Evolved Packet System (EPS); Mobility Management Entity (MME) and Serving GPRS Support Node (SGSN) related Interfaces based on Diameter protocol (Release 10)," 3GPP TS 29.272, V10.2.0 pp. 1-95 (Mar. 2011).
3GPP "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (Dec. 22, 2010).
3GPP, "3rd Generation Partnership Project; Technical Specification Group Core Network and Terminals; Sh Interface based on Diameter protocol; Protocol details (Release 8), " 3GPP TS 29.329, V8.8.0 (Dec. 2010).
Communication pursuant to Article 94(3) EPC for European Application No. 05 854 512.0 (Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228; V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207; V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251 V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE+ePC=EPS), IMS, PCC and SDM," EFORT, pp. 1-229 (Part 1 of 2) (May 2010).
Znaty, "Diameter, GPRS, (LTE+ePC=EPS), IMS, PCC and SDM," EFORT, pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Communication pursuant to Article 94(3) EPC for European Application No. 05854512.0 (Feb. 8, 2010).
Final Official Action for U.S. Appl. No. 11/303,757 (Dec. 9, 2009).
"3rd Generation Partnership Project; Technical Specification Group Services and System Aspects; Policy and charging control architecture (Release 9)," 3GPP TS 23.203, V9.3.0 (Dec. 2009).
Supplementary European Search Report for European Application No. 05854512.0 (Nov. 17, 2009).
Official Action for U.S. Appl. No. 11/303,757 (May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirement for U.S. Appl. No. 11/303,757 (Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Rouse, "Platform," http://searchservervirtualization.techtarget.com/definition/platform, pp. 1-2 (2006-2009).
Hakala et al., "Diameter Credit-Control Application,"RFC 4006, pp. 1-114 (Aug. 2005).
Calhoun et al., "Diameter Network Access Server Application," RFC 2005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-00, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
Calhoun et al., "Diameter Base Protocol," RFC 3588, pp. 1-147 (Sep. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 In Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Downloaded from Internet on Dec. 16, 2005) (Sep. 13, 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).

(56) References Cited

OTHER PUBLICATIONS

Adoba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Bemers-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).

* cited by examiner

METHODS, SYSTEMS, AND COMPUTER READABLE MEDIA FOR USING A DIAMETER ROUTING AGENT (DRA) TO OBTAIN MAPPINGS BETWEEN MOBILE SUBSCRIBER IDENTIFICATION INFORMATION AND DYNAMICALLY ASSIGNED INTERNET PROTOCOL (IP) ADDRESSES AND FOR MAKING THE MAPPINGS ACCESSIBLE TO APPLICATIONS

TECHNICAL FIELD

The subject matter described herein relates to making mobile subscriber identification information accessible to applications. More particularly, the subject matter described herein relates to methods, systems, and computer readable media using a DRA to obtain mappings between mobile subscriber identification information and dynamically assigned IP addresses and for making the mappings accessible to applications.

BACKGROUND

When a mobile device, such as a mobile handset, accesses a network, the mobile device may be dynamically assigned an IP address so that the mobile device can communicate with applications over the Internet. One problem for application servers in the mobile Internet space is that the application servers may not receive the subscriber's identifying information, such as the mobile subscriber integrated services digital network (MSISDN) number or international mobile station identifier (IMSI), when the application servers receive a new data session for the subscriber. Application servers might only receive the dynamically assigned IPv4 or v6 address for the data session and may need to determine the identity of the subscriber, for example, for billing purposes.

Accordingly, there exists a need for methods, systems, and computer readable media for methods, systems, and computer readable media for using a DRA to obtain mappings between mobile subscriber identification information and dynamically assigned IP addresses and for making the mappings accessible to applications.

SUMMARY

The subject matter described herein includes methods, systems and computer readable media for using a DRA to obtain mappings between mobile subscriber identification information and dynamically assigned IP addresses and for making the mappings accessible to applications. One exemplary method includes, at a DRA, receiving a Diameter message containing a dynamically assigned IP address and mobile subscriber identification information. The method further includes routing the received Diameter signaling message. The method further includes copying, by the DRA, the IP address and the mobile subscriber identification information from the message. The method further includes making a mapping between the dynamically assigned IP address and the subscriber identification information accessible to applications.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
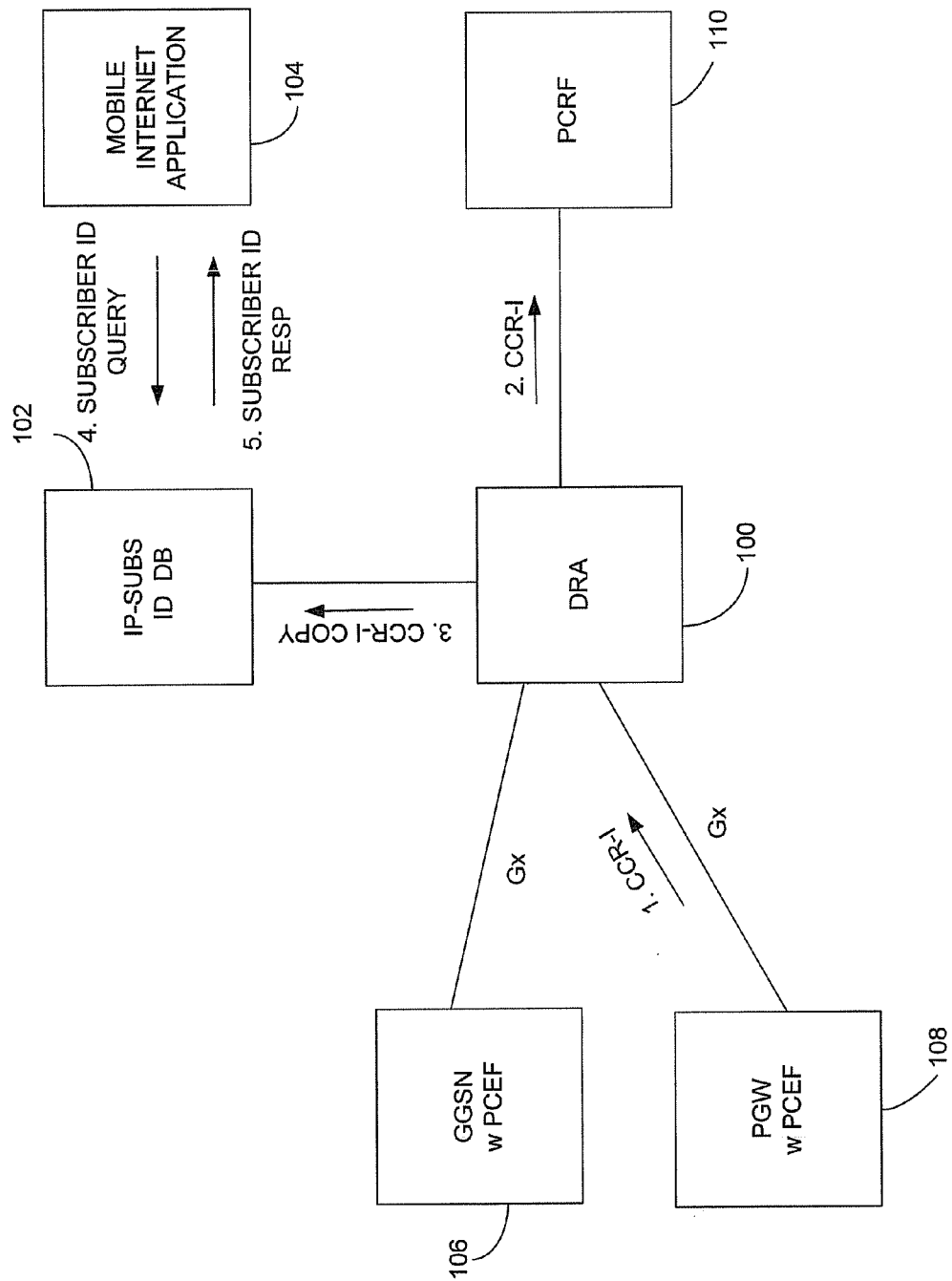
FIG. 1 is a network diagram illustrating an exemplary system for using a DRA to obtain mappings between dynamically assigned IP addresses and mobile subscriber identification information and for making the mappings accessible to applications according to an embodiment of the subject matter described herein.

The subject matter described herein includes methods, systems, and computer readable media for using a DRA to obtain mappings between mobile subscriber identification information and dynamically assigned IP addresses and for making the mappings accessible to applications. FIG. 1 is a network diagram illustrating a DRA and other nodes associated with providing services to mobile devices. Referring to FIG. 1, DRA 100 routes received Diameter signaling messages. DRA 100 may also be referred to as a Diameter signaling router or DSR. In addition to routing received Diameter signaling messages, DRA 100 may include a message copy function that copies certain Diameter signaling messages to a dynamic IP to mobile subscriber ID mapping database 102, which may be accessible by applications, such as mobile Internet application 104, to obtain mobile subscriber identification information. DRA 100 may obtain mappings between mobile subscriber identification information and dynamically assigned IP addresses from Diameter signaling messages received on the Gx interface between gateway GPRS support node (GGSN) 106 configured with a policy charging and enforcement function (PCEF) or from a packet data network (PDN) gateway (PGW) 108 configured with a PCEF. DRA 100 may route messages received on the Gx interface to policy and charging rules function (PCRF) 110. PCRF 110 may determine the appropriate policy and charging rules to apply to a given session in response to requests from PCEFs.

In the example illustrated in FIG. 1, in step 1, DRA 100 receives a credit control request-initial (CCR-I) message from PGW 108. The CCR-I message may be generated by the PCEF function of PGW 108 to determine the appropriate charging and policy rules to apply to a data session requested by mobile subscriber. In step 2, DRA 100 receives the CCR-I message and routes the CCR-I message to PCRF 110, which determines the appropriate policy and charging rules to apply to the session.

In step 3, DRA 100 copies the CCR-I message or at least the dynamically assigned IP address and mobile subscriber identification information from the CCR-I message to dynamic IP to mobile subscriber ID mapping database 102. Upon receipt of the CCR-I message, database 102 may store the mapping between the dynamically assigned IP address and the mobile subscriber identifier. In step 4, application 104 queries dynamic IP to mobile subscriber ID mapping database 102 with the dynamically assigned IP address, and, in step 5, database 102 responds with the mobile subscriber identification information.

Figure 2:
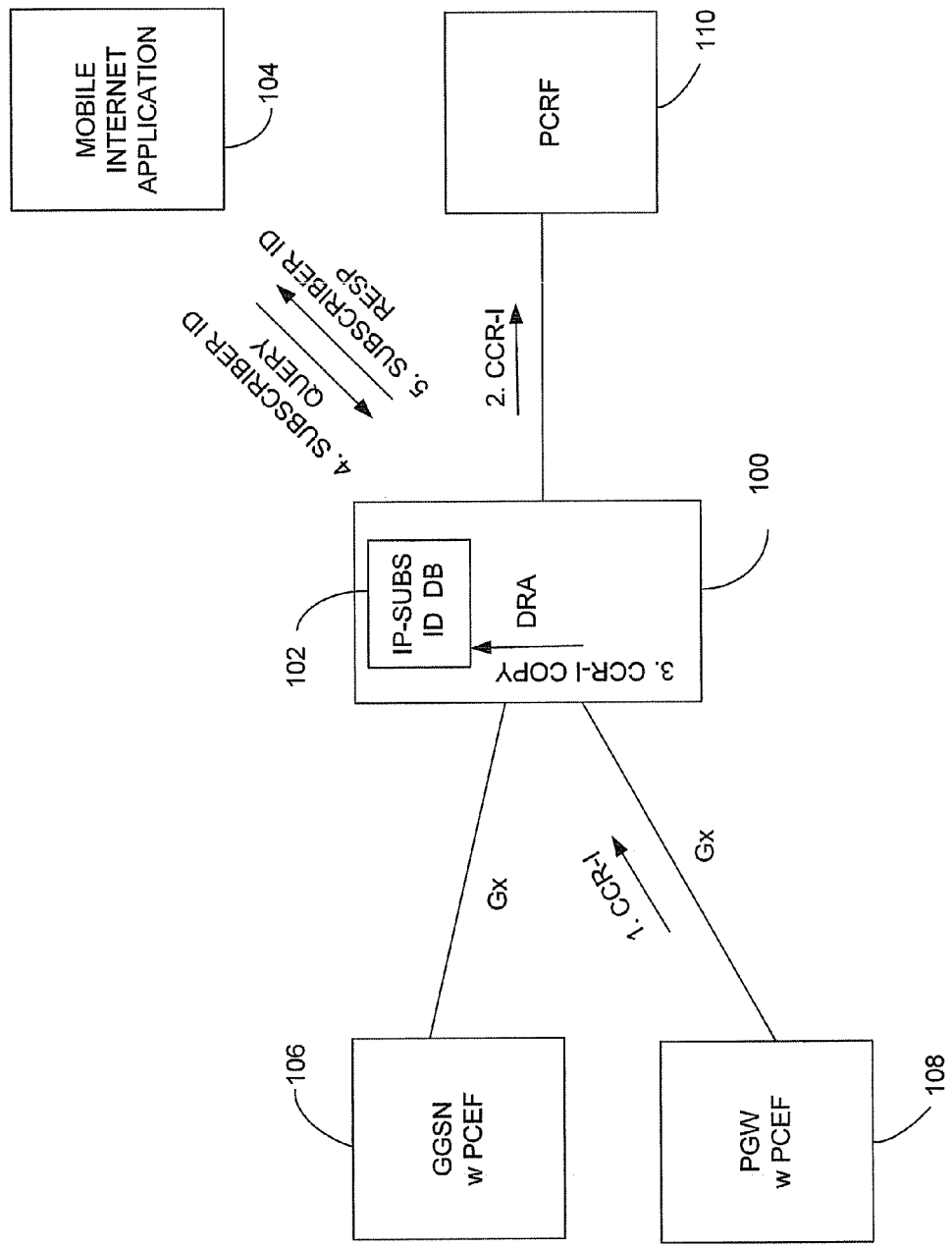
FIG. 2 is a network diagram illustrating an exemplary system for using a DRA to obtain mappings between dynamically assigned IP addresses and mobile subscriber identification information and for making the mappings accessible to applications according to an embodiment of the subject matter described herein.

In FIG. 1, dynamic IP to mobile subscriber identification information mapping database 102 is external to DRA 100. In an alternate implementation, database 102 may be internal to DRA 100. FIG. 2 illustrates such an embodiment. Referring to the message flow in FIG. 2, in step 1, PGW 108 sends a CCR-I message to PCRF 110 to determine the appropriate policy and charging rules to apply to a new session. In step 2, DRA 100 routes the CCR-I message to PCRF 110. In step 3, DRA 100 copies the CCR-I message or at least the mapping between the mobile subscriber identification information and the dynamically assigned IP address associated with the new session and stores the information in its internal dynamic IP to mobile subscriber ID mapping database 102. In step 4, mobile Internet application 104 queries DRA 100 to determine the mobile subscriber identification information. The query may include the dynamically assigned IP address. In response to the query, DRA 100 accesses its internal dynamic IP to mobile subscriber ID mapping database 102 and obtains the mobile subscriber identification information. In step 5, DRA 100 responds to application 104 with the mobile subscriber identification information, such as the IMSI or MSISDN.

Figure 3:
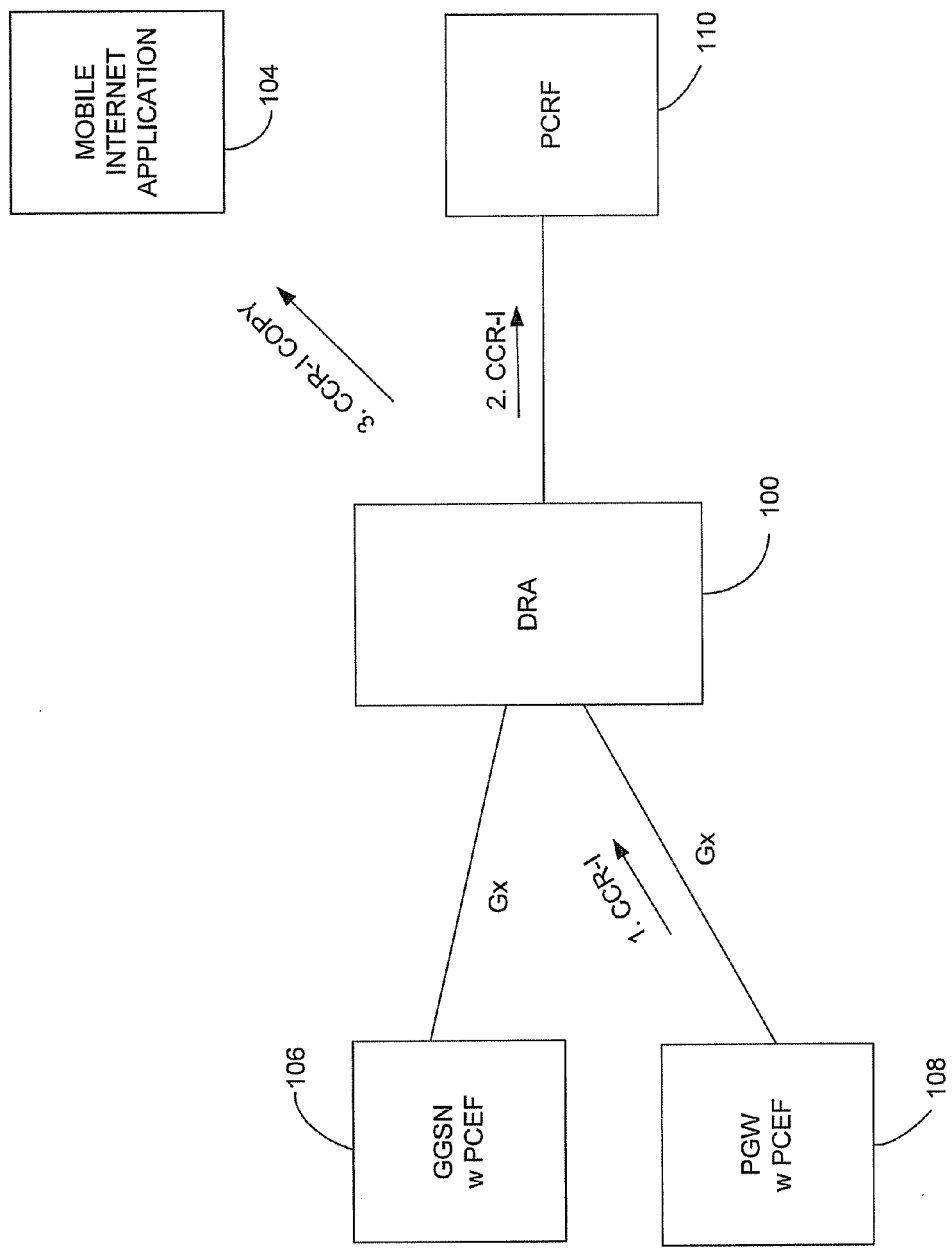
FIG. 3 is a network diagram illustrating an exemplary system for using a DRA to obtain mappings between dynamically assigned IP addresses and mobile subscriber identification information and for making the mappings accessible to applications according to an embodiment of the subject matter described herein.

In yet another implementation, DRA 100 may not maintain the mapping between the dynamically assigned IP address and the mobile subscriber identifier but instead may identify the application from the CCR-I message or have pre-configured information about the application and push the mapping to the application without requiring a query from the application. This scenario is illustrated in FIG. 3. Referring to the message flow in FIG. 3, in step 1, PGW 108 sends a CCR-I message to PCRF 110 to determine the appropriate policy and charging rules to apply to a new session. In step 2, DRA 100 routes the CCR-I message to PCRF 110. In step 3, DRA 100 identifies the application associated with the new session from the CCR-I message, copies the CCR-I message or at least the mapping of the mobile subscriber identifier to the dynamically assigned IP address, and sends the copied CCR-I message to application 104. The embodiment illustrated in FIG. 3 is advantageous in that application 104 is not required to query a database to obtain the mobile subscriber identification information.

Figure 4:
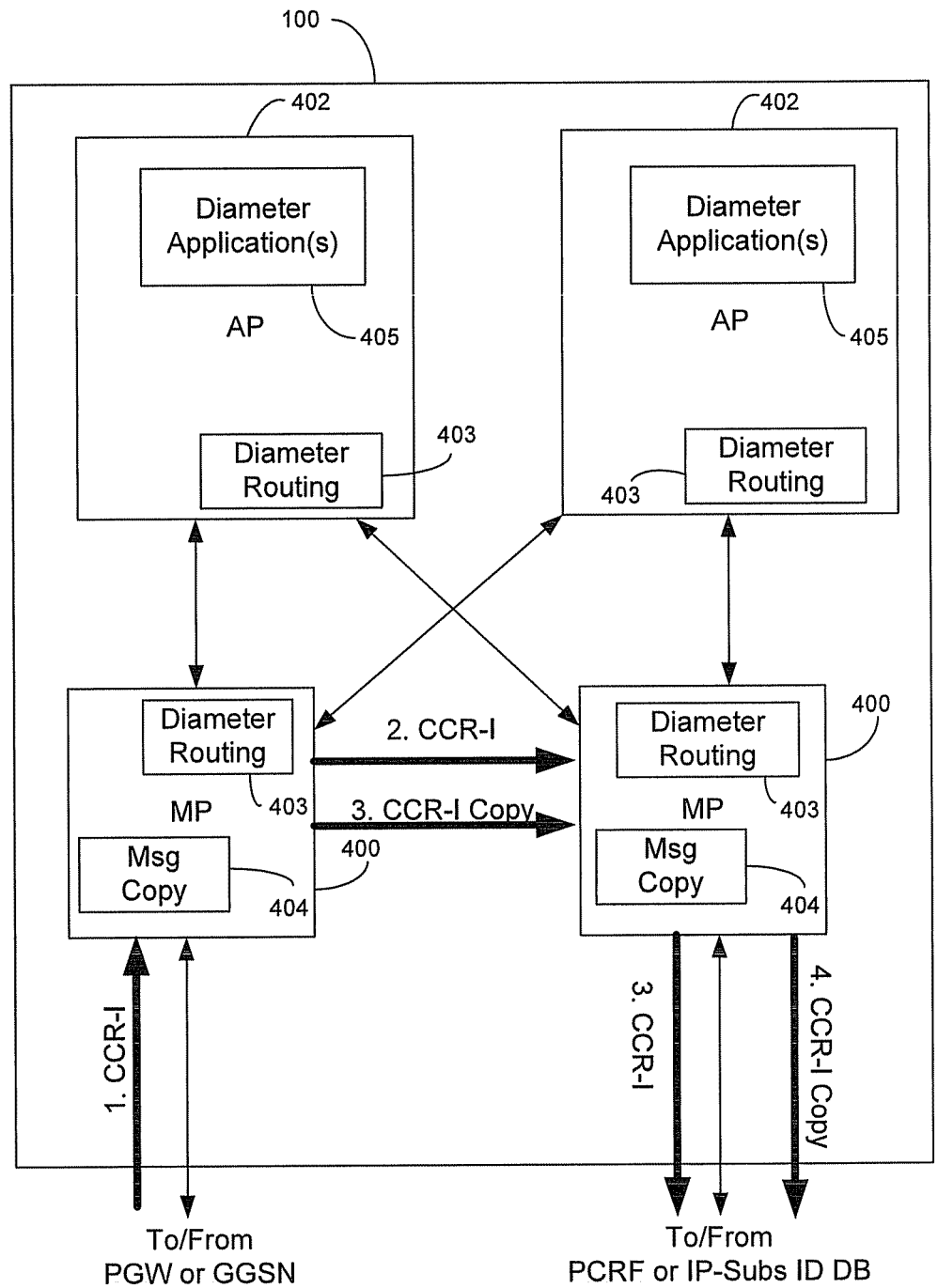
FIG. 4 is a block diagram for illustrating an exemplary internal architecture and message flow for using a DRA to obtain mappings between mobile subscriber identification information and dynamically assigned IP addresses and for making the mappings available to applications according to an embodiment of the subject matter described herein.

FIG. 4 illustrates an exemplary internal architecture and message flow within DRA 100 for the scenario illustrated in FIG. 1 where the dynamic IP to mobile subscriber identification information database is external to DRA 100. In FIG. 4, DRA 100 includes a plurality of message processors 400 and application processors 402. Message processors 400 and application processors 402 may each include a printed circuit board with one or more microprocessors and associated memory located thereon. Each microprocessor may execute one or more Diameter related modules for routing or processing Diameter signaling messages. In the illustrated example, message processors 400 include Diameter routing modules 403 and message copy modules 404. Diameter routing modules 403 route received Diameter signaling messages. Message copy modules 404 copy information, such as mappings between dynamically assigned IP addresses and mobile subscriber identifiers, from received signaling messages. Application processors 402 may host one or more Diameter applications 405 and may also include Diameter routing modules 403.

In the message flow illustrated in FIG. 4, in step 1 a CCR-I message is received by one of message processors 400. In step 2, the Diameter routing modules 403 on ingress message processor 400 routes the CCR-I message to egress message processor 400. In step 3, egress message processor 400 forwards the CCR-I message over the network to the destination. When the original CCR-I message is received by Diameter message processor 400, message copy module 404 may identify the CCR-I message as being of the type that contains information for mapping a dynamically assigned IP address for a session to a mobile subscriber identifier, such as an MSISDN or IMSI. Accordingly, in step 4, message copy module 404 on ingress message processor 400 makes a copy of the CCR-I or at least the mapping between the dynamically assigned IP address and the mobile subscriber identification information and forwards the copy to egress message processor 400 that is associated with external dynamic IP to mobile subscriber ID mapping database 102. In step 5, egress message processor 402 forwards the copied information to database 102, which stores the mapping information for subsequent access by applications.

Figure 5:
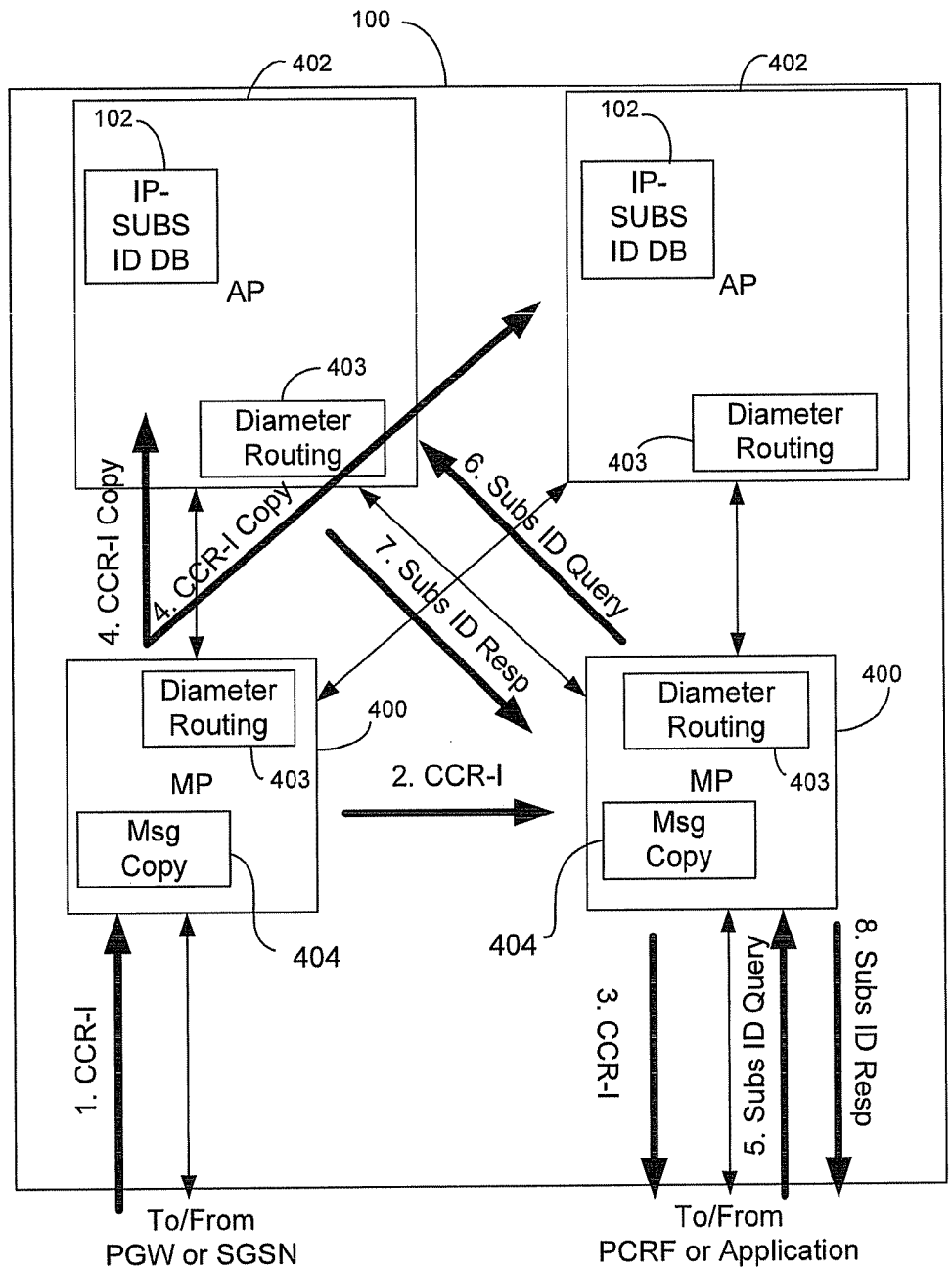
FIG. 5 is a block diagram illustrating an exemplary internal architecture for using a DRA to obtain mappings between mobile subscriber identification information and dynamically assigned IP addresses and for making the mappings available to applications according to an embodiment of the subject matter described herein.

FIG. 5 illustrates an exemplary internal architecture for DRA 100 corresponding to the scenario illustrated in FIG. 2 where the dynamic IP address to mobile subscriber identification database is internal to DRA 100. Referring to FIG. 5, each application processor 402 hosts dynamic IP to mobile subscriber ID mapping database 102. Dynamic IP to mobile subscriber ID mapping databases 102 hosted by application processors 402 may be identically provisioned, and message processors 400 may load share queries between databases hosted by different application processors 402. Referring to the message flow illustrated in FIG. 5, in steps 1-3, the CCR-I message is received by DRA 100 and routed to egress Diameter message processor 400 associated with PCRF 110, similar to the message flow illustrated in FIG. 2. In step 4, message copy module 404 on ingress message processor 400 copies the CCR-I message or at least the dynamically assigned IP address and the mobile subscriber identification information from the CCR-I message and sends the copy to application processors 402, which store the information in internal databases 102. In step 5, application 104 queries DRA 100 for the subscriber identification information. The query is forwarded to one of the application processors 402 in step 6. In step 7, receiving application processor 402 accesses its internal database 102 and responds with the subscriber identification information. In step 8, the subscriber identification information is provided to querying application 104.

Figure 6:
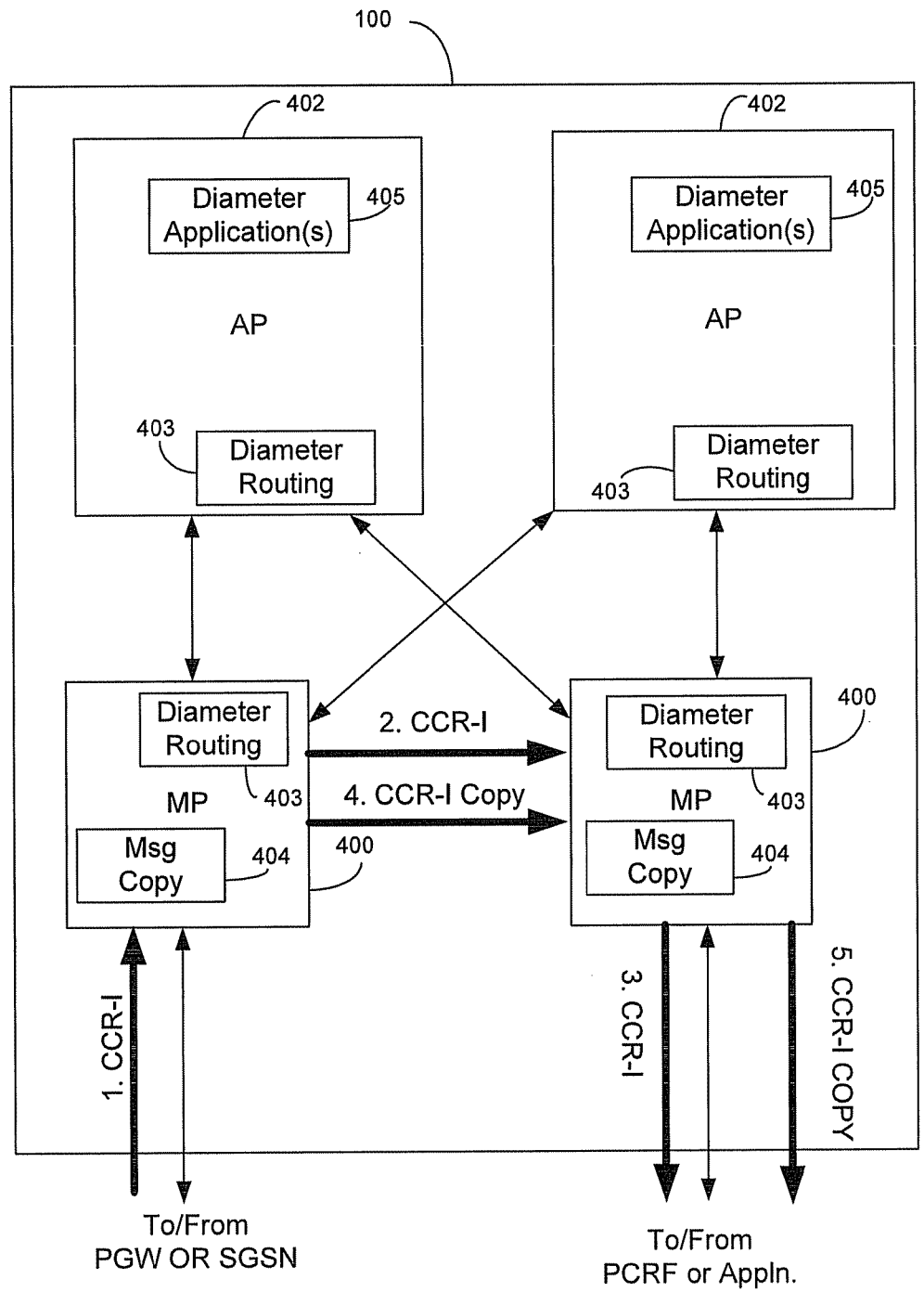
FIG. 6 is a block diagram illustrating an exemplary architecture and message flow for using a DRA to obtain mappings between mobile subscriber identification information and dynamically assigned IP addresses and for making the mappings available to applications according to an embodiment of the subject matter described herein.

FIG. 6 is a block diagram and message flow illustrating an exemplary architecture for DRA 100 for the scenario illustrated in FIG. 3 where the DRA 100 pushes subscriber identification information to application 104 without requiring a query from the application. Referring to the message flow in FIG. 6, in step 1, the CCR-I message is received by ingress message processor 400, which routes the CCR-I message to egress message processor 400 in step 2. In step 3, egress message processor 400 routes the CCR-I message to its intended destination, which in this example is PCRF 110.

In step 4, message copy module 404 on ingress message processor 400 identifies application 104 from the CCR-I message, copies the CCR-I message and (in step 5) provides the message copy to egress message processor 400 that is associated with the application. The application may be identified from the access point name (APN) or other parameter in the CCR-I message or may be pre-configured. In step 6, egress message processor 400 pushes the mapping information to the identified application directly without requiring a query from the application.

Figure 7:
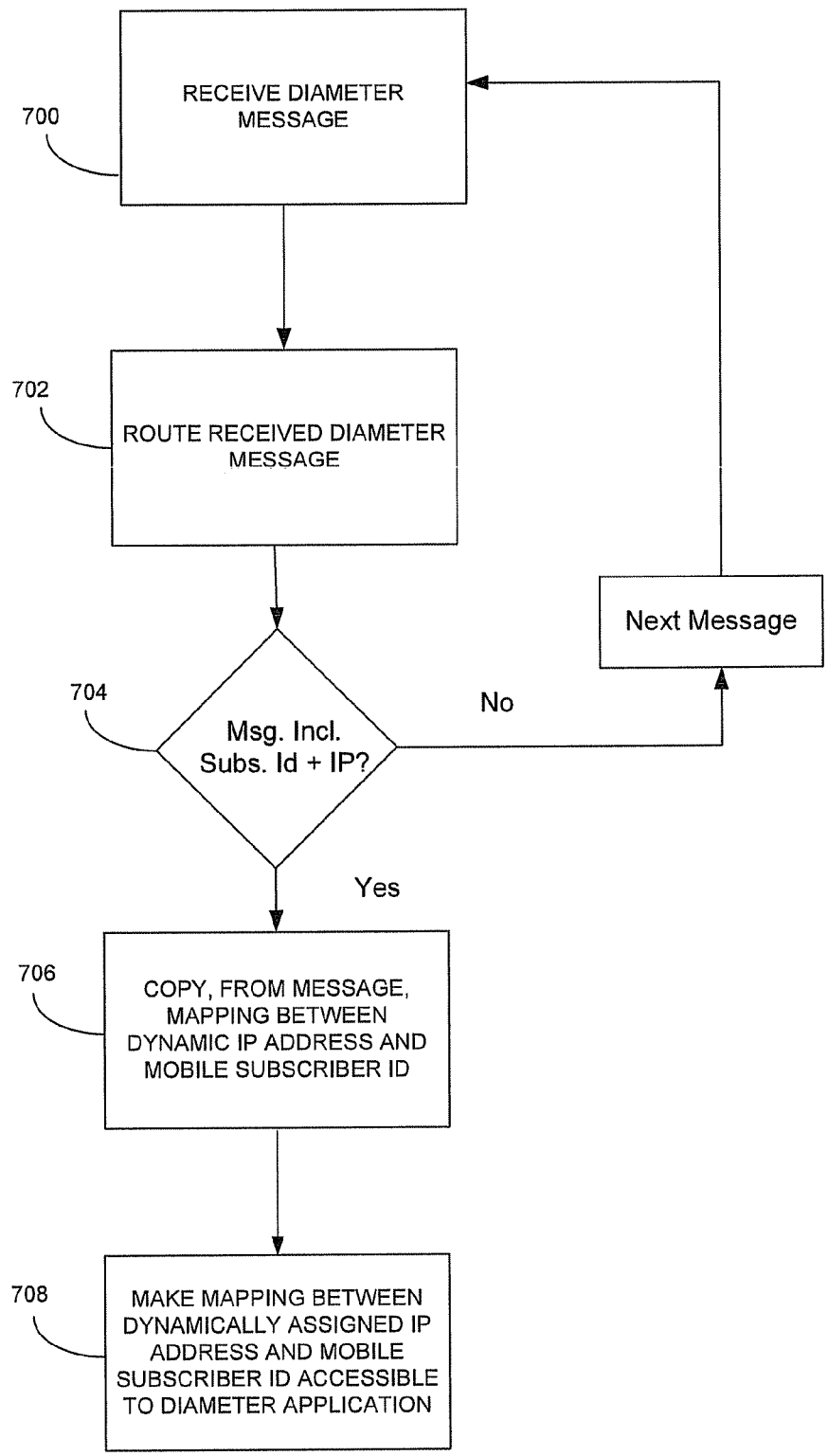
FIG. 7 is a flow chart illustrating an exemplary process for using a DRA to obtain mappings between dynamically assigned IP addresses and mobile subscriber identification information and for making the mappings accessible to applications according to an embodiment of the subject matter described herein.

FIG. 7 is a flow chart illustrating exemplary steps for using a DRA to obtain mappings between dynamically assigned IP addresses and mobile subscriber identifiers and for making the mappings accessible to applications according to an embodiment of the subject matter described herein. Referring to FIG. 7, in step 700, a Diameter signaling message is received. For example, DRA 100 may receive a CCR-I message from a PGW or other entity. In step 702, the DRA routes the received Diameter signaling message. For example, DRA 100 may route the CCR-I to PCRF 110. In step 704, it is determined whether the message is of a type that contains information that can be used to map a mobile subscriber identifier to an IP address. In one example, DRA 100 may identify CCR-I messages as being of the type that contain dynamic IP address to mobile subscriber identifier mapping information. Other Diameter message types may be routed or processed by DRA 100 according to the message type. If the message is determined not to be of the type that contains the mapping information, control returns to step 700 where the next message is processed. If the message is determined to be of the type that contains the mapping information, in step 706, the mapping between the dynamic IP address and the mobile subscriber identification information in the message is copied. For example, a message copy module 404 in DRA 100 may copy the dynamically assigned IP address and the MSISDN and/or IMSI from the message. In step 706, the mapping between the dynamically assigned IP address and the mobile subscriber identification information is made accessible to an application. For example, DRA 100 may push the mapping to an application, store the mapping in an internal database accessible to applications, or provide the mapping to an external database accessible to applications.

In addition to maintaining mappings between a dynamically assigned IP address and mobile subscriber identification information copied from a received Diameter signaling message, a DRA according to an embodiment of the subject matter described herein may also maintain mappings between different mobile subscriber identifiers and make the mappings available to applications. For example, DRA 100 in any of the above-described examples may copy a first mobile subscriber identifier, such as an IMSI and the dynamically assigned IP address from a received Diameter signaling message, such as a Gx signaling message. DRA 100 may be preconfigured with mappings between the first mobile subscriber identifier and as second mobile subscriber identifier, such as an MSISDN number. Applications, such as application 104, may then query DRA 100 with the MSISDN number and receive the IMSI.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for using a Diameter routing agent (DRA) to obtain mappings between mobile subscriber identification information and dynamically assigned Internet protocol (IP) addresses and for making the mappings accessible to applications, the method comprising:
    receiving, by a DRA, a Diameter message containing a dynamically assigned Internet protocol (IP) address and mobile subscriber identification information;
    routing, by the DRA, the received Diameter signaling message;
    copying, by the DRA, the IP address and the mobile subscriber identification information from the message, wherein the copying is performed by a Diameter message copy module in the DRA that is separate from a Diameter routing module in the DRA that performs the routing; and
    making, by the DRA, a mapping between the dynamically assigned IP address and the subscriber identification information accessible to applications, wherein making a mapping between the dynamically assigned IP address and the mobile subscriber identifier available to applications includes storing the mapping between the dynamically assigned IP address and the mobile subscriber identifier in a database upon receipt of the Diameter message.

2. The method of claim 1 wherein receiving a Diameter message comprises receiving a credit control request initial (CCR-I) message from a policy charging and enforcement function (PCEF).

3. The method of claim 1 wherein copying the IP address and mobile subscriber identifier includes copying the Diameter message using a message copy function of the DRA.

4. The method of claim 1 wherein making a mapping between the dynamically assigned IP address and the mobile subscriber information accessible to the applications includes providing the dynamically assigned IP address and the mobile subscriber identifier to the database, wherein the database is internal to the DRA and accessible to the applications.

5. The method of claim 1 wherein making a mapping between the dynamically assigned IP address and the mobile subscriber information accessible to the applications includes providing the dynamically assigned IP address and the mobile subscriber identifier to the database, wherein the database is external to the DRA and accessible to the applications.

6. The method of claim 1 wherein making a mapping between the dynamically assigned IP address and the mobile subscriber identification information accessible to the applications includes pushing the mapping from the DRA to an application identified in the received Diameter message.

7. The method of claim 1 comprising receiving a query from an application, the query including the dynamically assigned IP address, and providing the subscriber identification information to the application in response to the query.

8. The method of claim 7 wherein receiving a query includes receiving the query at a dynamic IP address to mobile subscriber identification information database internal to the DRA and wherein providing the mobile subscriber identification information in response to the query includes accessing the database and providing a response to the application from the DRA.

9. The method of claim 7 wherein receiving a query includes receiving the query at a dynamic subscriber IP address to mobile subscriber identification information database external to the DRA and wherein providing the mobile subscriber identification information in response to the query includes accessing the database and providing a response to the application from the database.

10. The method of claim 1 comprising determining, by the DRA, whether the message is of a type that contains the dynamically assigned IP address and the mobile subscriber identification information and wherein copying the IP address and the mobile subscriber identification information includes copying the dynamically assigned IP address and the mobile subscriber identification information in response to a determination that the message is of a type that contains the mobile subscriber identification information and the dynamically assigned IP address.

11. The method of claim 1 comprising:
maintaining, by the DRA, a mapping between a first mobile subscriber identifier copied from the signaling message and a second mobile subscriber identifier;
receiving a query from an application that contains the second mobile subscriber identifier; and
responding to the application with the first mobile subscriber identifier.

12. The method of claim 11 wherein the first mobile subscriber identifier comprises an international mobile station identifier (IMSI) and the second mobile subscriber identifier comprises a mobile subscriber integrated services digital network (ISDN) number.

13. A system for using a Diameter routing agent (DRA) to obtain mappings between mobile subscriber identification information and dynamically assigned Internet protocol (IP) addresses and making the mappings accessible to applications, the system comprising:
a DRA including:
a Diameter message processor for receiving a Diameter message containing a dynamically assigned Internet protocol (IP) address and mobile subscriber identification information;
a Diameter routing module for routing the received Diameter message; and
a Diameter message copy module, located within the DRA, for copying the IP address and the mobile subscriber identification information from the message and for making a mapping between the dynamically assigned IP address and the subscriber identification information accessible to applications, wherein making a mapping between the dynamically assigned IP address and the mobile subscriber identifier available to applications includes storing the mapping between the dynamically assigned IP address and the mobile subscriber identifier in a database upon receipt of the Diameter message, wherein the Diameter message copy module in the DRA is separate from the Diameter routing module in the DRA.

14. The system of claim 13 wherein receiving a Diameter message comprises receiving a credit control request initial (CCR-I) message from a policy charging and enforcement function (PCEF).

15. The system of claim 13 wherein the database comprises a dynamic IP address to mobile subscriber identification information mapping database, wherein the DRA is configured to store the dynamically assigned IP address and the mobile subscriber identification information in the database within the DRA and wherein the DRA allows the applications to access the database.

16. The system of claim 13 wherein the database comprises a dynamic IP address to mobile subscriber identification information mapping database external to the DRA, wherein the message copy module is configured to forward the copied IP address and mobile subscriber identification information to the external database, and wherein the external database is accessible to the applications.

17. The system of claim 13 wherein the message copy module is configured to push the dynamically assigned IP address and the mobile subscriber identifier to an application identified in the received Diameter message.

18. The system of claim 13 wherein the database comprises a dynamic IP address to mobile subscriber identification information database for receiving a query from an application, the query including the dynamically assigned IP address and providing the subscriber identification in response to the query.

19. The system of claim 18 wherein the dynamic IP address to mobile subscriber identification information database is internal to the DRA.

20. The system of claim 18 wherein the dynamic IP address to mobile subscriber identification information database is external to the DRA.

21. The system of claim 18 wherein the message copy function is configured to determine whether the message is of a type that contains the dynamically assigned IP address and the mobile identification information.

22. The system of claim 13 wherein the DRA is configured to:
maintain a mapping between a first mobile subscriber identifier copied from the signaling message and a second mobile subscriber identifier;
receive a query from an application that contains the second mobile subscriber identifier; and
respond to the application with the first mobile subscriber identifier.

23. The system of claim 22 wherein the first mobile subscriber identifier comprises an international mobile station identifier (IMSI) and the second mobile subscriber identifier comprises a mobile subscriber integrated services digital network (ISDN) number.

24. A non-transitory computer readable medium having stored thereon executable instructions that when executed by a computer control the computer to perform steps comprising:
receiving, by a Diameter routing agent (DRA), a Diameter message containing a dynamically assigned Internet protocol (IP) address and mobile subscriber identification information;
routing, by the DRA, the received Diameter signaling message;
copying, by the DRA, the IP address and the mobile subscriber identification information from the message; and making, by the DRA, a mapping between the dynamically assigned IP address and the subscriber identification information accessible to applications, wherein making a mapping between the dynamically assigned IP address and the mobile subscriber identifier available to applications includes storing the mapping between the dynamically assigned IP address and the mobile subscriber identifier in a database upon receipt of the Diameter message, wherein the copying is performed by a Diameter message copy module in the DRA that is separate from a Diameter routing module in the DRA that performs the routing.

* * * * *